United States Patent
Hull et al.

[11] Patent Number: 5,860,668
[45] Date of Patent: Jan. 19, 1999

[54] SEMITRAILER HAVING AN EXTENDIBLE DOLLY

[76] Inventors: Harold L. Hull, 401 Canyon Way, #43, Sparks, Nev. 89434; Terrence W. Stevenson, P.O. Box 538, Mukilteo, Wash. 98275

[21] Appl. No.: 814,777

[22] Filed: Mar. 10, 1997

[51] Int. Cl.[6] ................................................. B62D 53/08
[52] U.S. Cl. .................. 280/408; 280/411.1; 280/149.2; 280/407.1
[58] Field of Search ................................ 280/408, 411.1, 280/149.2, 407.1, 418.1, 438.1, 412

[56] References Cited

U.S. PATENT DOCUMENTS

| | | | |
|---|---|---|---|
| 3,508,762 | 4/1970 | Pratt | 280/407.1 X |
| 4,400,004 | 8/1983 | Arguin | 280/408 |
| 4,580,805 | 4/1986 | Bertolini | 280/407.1 |
| 4,673,191 | 6/1987 | Arguin | 280/408 |
| 4,955,629 | 9/1990 | Todd, Jr. et al. | 280/407.1 |
| 4,993,737 | 2/1991 | Torcomian | 280/407.1 X |
| 5,630,603 | 5/1997 | Turner et al. | 280/407.1 |

*Primary Examiner*—Christopher P. Ellis

[57] ABSTRACT

A convertible chassis for a dual axle semitrailer for converting the semitrailer to a single axle trailer having an attached dolly to pull a second trailer thereon.

2 Claims, 7 Drawing Sheets

SEMITRAILER HAVING AN EXTENDIBLE DOLLY

FIELD OF THE INVENTION

The present invention relates to semitrailers but more particularly relates to a dual axle trailer that can be converted to a single axle trailer with a fixedly attached dolly, and the dolly may be used to pull a second trailer.

BACKGROUND OF THE INVENTION

Within the trucking industry freight trucks traveling on highways have been well known vehicles for many years, the larger of such trucks generally having the form of a tractor pulling a semitrailer and being connected thereto by the combination of a horizontal fifth wheel plate carried by the tractor and a king pin carried on the forward portion of the semitrailer. This truck arrangement permits a pivoting action about the fifth wheel to facilitate maneuvering the truck into small loading zones and this allows for a much shorter turning radius for the entire truck.

In more recent years the trucking industry has been experimenting with the addition of a trailer attached to the rear of the semitrailer. A simple, free coupling between the semitrailer and the trailer is not satisfactory because there is no control over the towed trailer and the forward supporting wheels and axle are free to pivot and thereby to cause "jackknifing" and other linkage difficulties that can endanger the entire combination. Rigid connection arrangements between the semitrailer and the trailer are not acceptable because the truck is too long for desired maneuverability. Typical of such structures are U.S. Pat. Nos. 3,004,772; 3,102,738; 3,288,492 and 3,317,219. It was apparent that a second fifth wheel attachment between the semitrailer and the trailer was necessary. It is not feasible to have a fixed extension structure behind a semitrailer because that would interfere with the rear-end loading and unloading of the semitrailer which is important in being able to service loading docks built to load and unload a semitrailer from the rear. Hence, side loading and unloading have not been adopted, which otherwise would permit an extension from the rear to provide a second fifth wheel.

In general, the prior art has attempted to solve this problem by providing a dolly, which is a short turn wheeled section carrying a fifth wheel plate on its upper surface and has means for a towing connection to the semitrailer ahead and is connected to the trailer behind by means of the second fifth wheel. Such an arrangement is shown in U.S. Pat. No. 3,746,369 where the dolly is an independent vehicular section which is attached to the semitrailer when desired, and in U.S. Pat. No. 3,246,912 where the dolly is a part of the load carrying structure of the semitrailer but which can be detached to become the dolly section. In U.S. Pat. No. 3,374,010 there is shown a semitrailer with an extendible chassis to provide a means for coupling a trailer to a semitrailer through a fifth wheel connection. This arrangement, however, will not satisfy highway transportation laws because for normal loading there are not enough wheels to distribute the load properly. A single pair of wheels at the rear of the semitrailer is moved to support the front of the trailer and no wheels are left to support the rear of the semitrailer. Furthermore, in the normal case the semitrailer has two pairs of rear wheels (two axles) and this patent does not provide for that arrangement. Generally, it would be expected that each of the semitrailer and the trailer would have a double axle arrangement at the rear of the vehicle.

It is to be noted that the use of dollies has many disadvantages, for example, injuries to drivers and hostlers is high, doubles cannot be backed up, the dolly must be licensed and registered, unit numbers and maintenance records must be kept, parking space in terminals must be provided, the dolly must be transported to the place of need, hostle time is longer, lights and flaps must be provided to transport a dolly at the rear of a unit, less stability during braking and in slippery conditions, the dolly may be stolen from open yards, etc. The present invention overcomes these disadvantages by fixedly attaching the dolly to the trailer in a manner heretofore not seen nor taught.

Still further attempts to overcome the above difficulties include U.S. Pat. No. 4,955,629 wherein they provide substantially extendible chassis to expose a fifth wheel to carry the second trailer, and in this arrangement the second trailer is actually carried by the frame of the front trailer, thus, the second trailer actually becomes a part of the load that is carried by the front trailer and therefore is considered to be an "B" train. This arrangement is most unacceptable and includes many drawbacks. Such as, this trailer would have to be built to withstand the pressures on the frame during encounters with uneven surfaces. For example, when the unit encounters a speed bump, the front axle will rise up and thus tend to lift the second axle, causing a downward bending action on the frame where the frame is exposed at the rear of the trailer. When the second axle encounters the bump, it would tend to lift the first axle causing the frame to bend upward in the exposed region, as well as try to separate the frame from the trailer in front of the axle. To counter these problems, the frame would need to be very strong and thus much to heavy. This is very important because trucking companies are very conscious of the empty weight of their units. Therefore it would be most unacceptable to increase the trailers weight by 8000 to 10,000 pounds (as taught within the prior art) which would severely cut into the payload the companies strive for. The present invention recognizes, addresses and resolves this problem by providing a shuttle which rides between the frame rails, with the dolly being far lighter in construction than the telescoping frame as taught within the prior art. The present invention would increase the weight of the frame by substantially only 1000 pounds or less, with the extra axle weighing about 2500 pounds. Therefore when compared to the weight of the cited reference, which is substantially twice as much, the present invention is most advantageous.

Still further within the cited reference, due to the increased weight of the frame, they must use a much larger tire than normal. This is most unacceptable as there are several million loading docks in the country, and they are designed for a standard height trailer, thus the cited reference would necessitate the need for special ramps to accommodate fork lift entry. Concern about highway damage is causing a move toward limiting the weight of an axle with a formula using per square inch of tire contact with the road, thereby discouraging the use of th single tire, as the single tire has less per square inch contact then the combined dual tire arrangement. The State of Washington has started making this change due to heavy Canadian trucks damaging the interstates. Therefore, the present invention overcomes these disadvantages by providing dual wheels which are standard size. Still further, the cited reference is much to costly to produce and it could not be easily installed on trailers which currently use dollies, as can the present invention.

Still further attempts to overcome the difficulties include U.S. Pat. No. 4,365,820 which also addresses the above problems with a sliding frame with a dual axle arrangement that slides rearward. Also, this constitutes a "B" train with the front trailer carrying the rear trailer. The frame would have to be very strong to carry the front trailer with the axles slid beyond the rear of the trailer. The dual axles are also limited to 34,000 pounds instead of 20,000 pounds that each single axle is allowed in most states.

OBJECTS OF THE INVENTION

It is therefore an object of the present invention to provide a dolly which is fixedly attached to the trailer, thus the dolly cannot be removed by the driver and/or stolen.

Another object of the present invention is to provide a dolly which is easier to hostle, is easier to back up, is safer with California chain laws, provides better braking as the second trailer includes two axles, and allows for more carrying capacity at the rear of the trailer due to the dual axles.

Yet another object of the present invention is to provide a telescoping dual axle arrangement wherein the front axle stays under the rear of the trailer and thus carries the load without undue stress put on the frame, this further allows for a lighter frame than the non-telescoping unit, and the rear axle slides far enough (beyond 8 feet) to qualify as two single axles, which allows the 20000 pounds each rule. The second axle is also free to articulate in the vertical plane, which relieves any stress between the axles when the unit encounters uneven ground. Therefore, the present invention provides a much lighter empty weight as well as a much higher axle weight allowance which would be much more desirable to the trucking companies.

Still a further object of the present invention is to provide a dual axle trailer that can be converted to a single axle trailer with an attached dolly to pull the second trailer.

Also, another object of the present invention is to provide a dolly which is most economical to manufacture.

Yet another object of the present invention is to provide a dolly which overcomes the disadvantages known within the prior art.

Other objects and advantages will be seen when taken into consideration with the following drawings and specification.

DETAILED DESCRIPTION OF THE DRAWINGS

Figure 1:
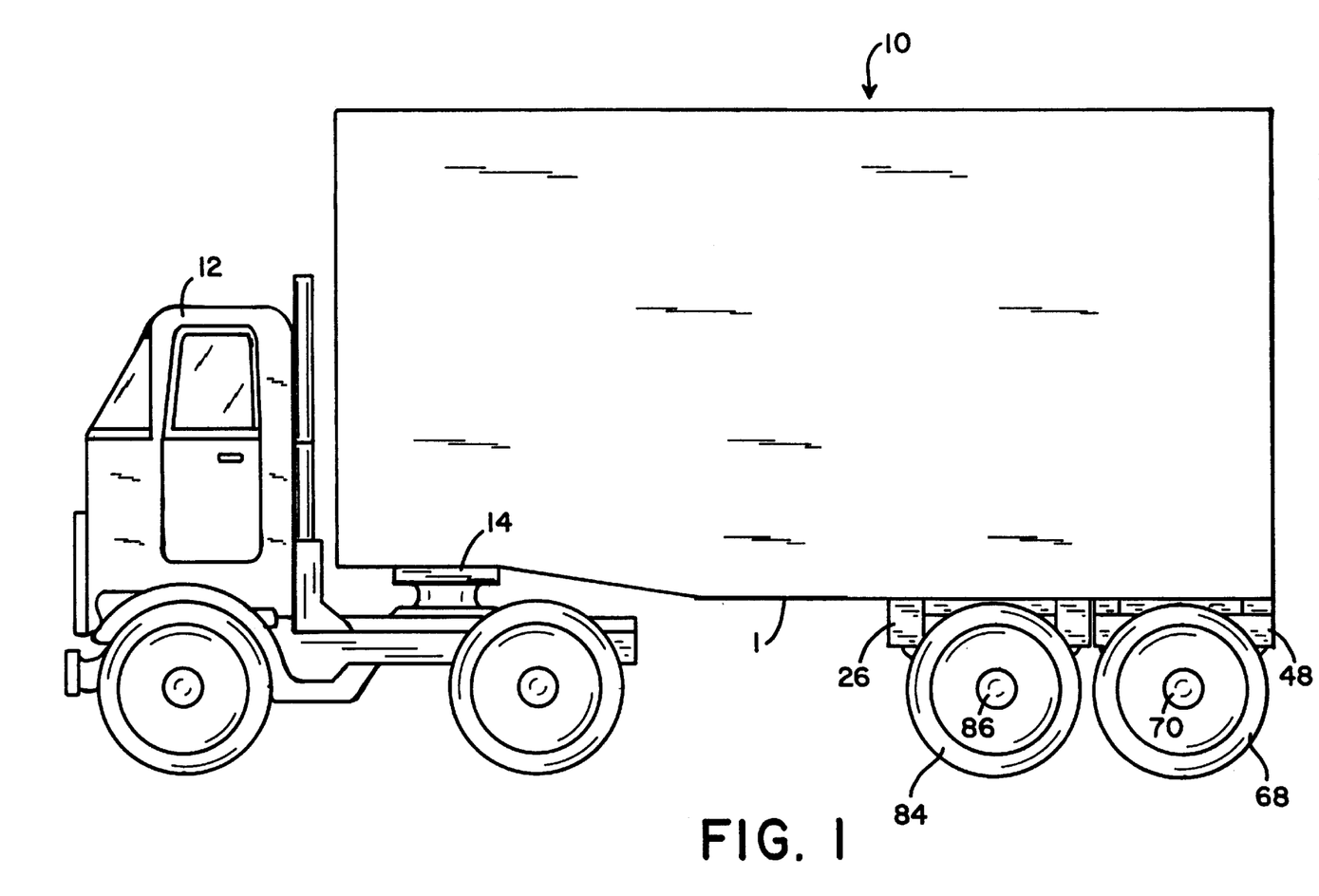
FIG. 1 is substantially an overview of the present invention.

Referring now in detail to the drawings wherein like elements refer to like characters throughout the views. In FIG. 1, arrow (10) represents an overview of the present invention which is substantially a semitrailer unit which is removably attached to a prior art highway tractor (12) by a prior art fifth wheel plate (14), with the semitrailer having two sides, a front, an openable rear for access to inside space, and a front pair of dual wheels (later described) and a rear pair of dual wheels (later described) mounted in first spaced tandem relationship adjacent the rear when the chassis (later described) is in a retracted position.

Figure 2:
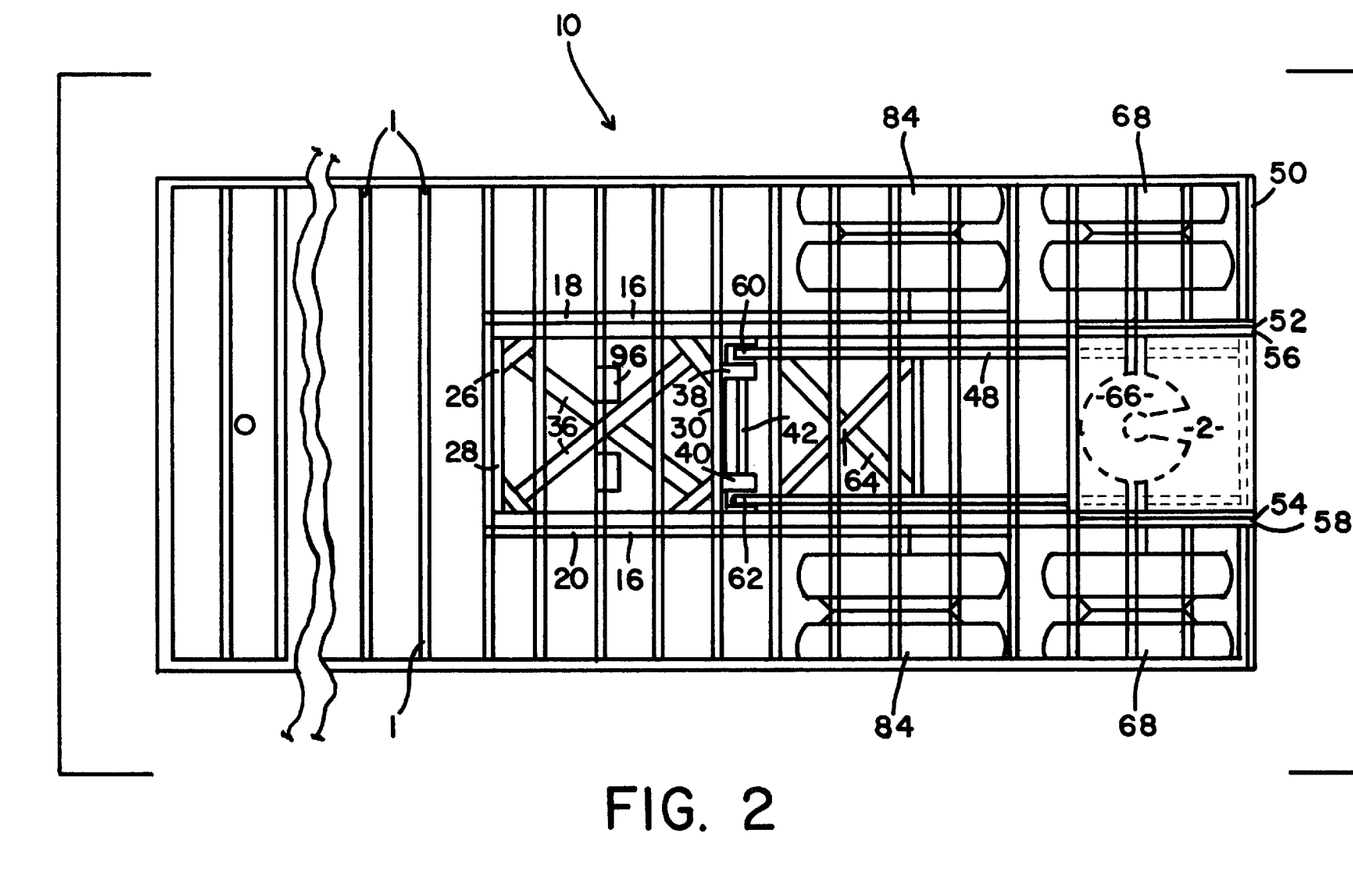
FIG. 2 is substantially a top view of a truck chassis containing the present invention which is substantially a retractable shuttle with an attached dolly.

Referring now to FIG. 2 wherein we partially show a support frames (1) spaced one foot apart for the entire length of the trailer (10) and the chassis (16) of the present invention including a first elongated I-beam (18) and a second elongated I-beam (20), with each I-beam (18 & 20) being fixedly positioned substantially parallel to each other and spaced apart, thus providing a first horizontal X-axis between the outermost exterior surfaces of each I-beam (18 & 20), (see FIG. 4), with each I-beam (18 & 20) having an interior elongated cavity (22) and an exterior elongated cavity (24), (more clearly shown in FIG. 6), with each interior cavity (22) being substantially opposed to each other. It is to be noted that chassis (16) is constructed as a typical prior art chassis, such as found on substantially any 28 foot van type semitrailer and therefore detailed specifications for construction of the semitrailer box is not completely herein disclosed. Plate (2) is a solid plate that is installed three inches above the I-beams (18 & 20), creating a cavity for the fifth wheel to slide into, thereby creating a chassis with an overall floor height equal to the present trailer. Plate (2) resting on the fifth wheel below also helps support the trailer when the axles are retracted.

Figure 3:
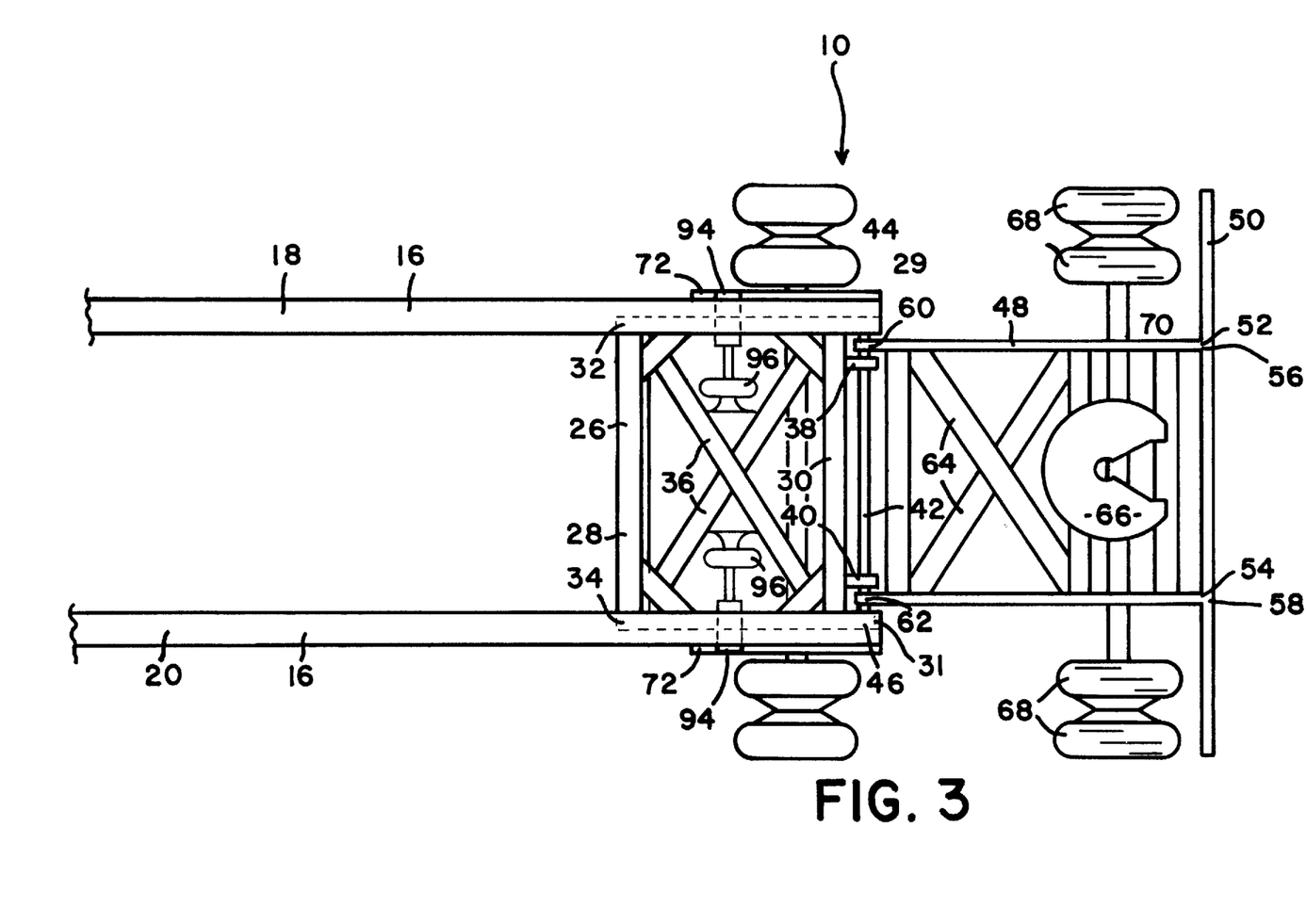
FIG. 3 is substantially a top view of FIG. 2 showing the shuttle and attached dolly in an extended position.

In FIGS. 2 & 3, (26) represents substantially a shuttle, with the shuttle substantially comprising first and second cross members (28 & 30) which are fixedly attached together and interconnected by first and second end members (32 & 34), with each member (32 & 34) being of a length longer than the distance between members (28 & 30), thus members (28, 30, 32 & 34) in combination form substantially a rectangular shaped shuttle having two protruding end sections (29 & 31), and each of the members (28, 30, 32 & 34) are held in a secure manner by multiple support structures (36), and members (32 & 34) are of a shape and size to be slidably retained within each interior cavity (22). Member (30) includes at least a first and a second protruding flange (38 & 40) each of which contain a bushing of a shape and size to slidably receive a pin (42) there through, with each end of pin (42) being also attached to end sections (29 & 31) with a like bushing such as (44 & 46), and pin (42) is held in place by the inside of the I-beams (18 & 20).

In FIGS. 2 & 3, (48) is substantially a dolly comprising an elongated bumper bar (50) having a first and a second attachment bar (52 & 54), each of which have a first end (56 & 58) fixedly attached to bumper bar (50), with each attachment bar (52 & 54) being positioned substantially parallel to each other and spaced apart a distance less than the distance between each of the I-beams (18 & 20), and each attachment bar (52 & 54) having a bore (not shown) through each second end (60 & 62) for slidably receiving pin (42) there through, thus the second end (60) of bar (52) is pivotably attached to pin (42) between bushings (38 & 44), and the second end (62) of bar (54) is pivotably attached to pin (42) between bushings (40 & 46), whereby, shuttle (26) and dolly (48) are fixedly attached together in a pivotable relationship. Dolly (48) further includes multiple support structures (64) for additional strength and/or for fixedly attaching a fifth wheel plate (66) thereto, with the fifth wheel plate being positioned at a location of engineering choice thereon.

Figure 5:
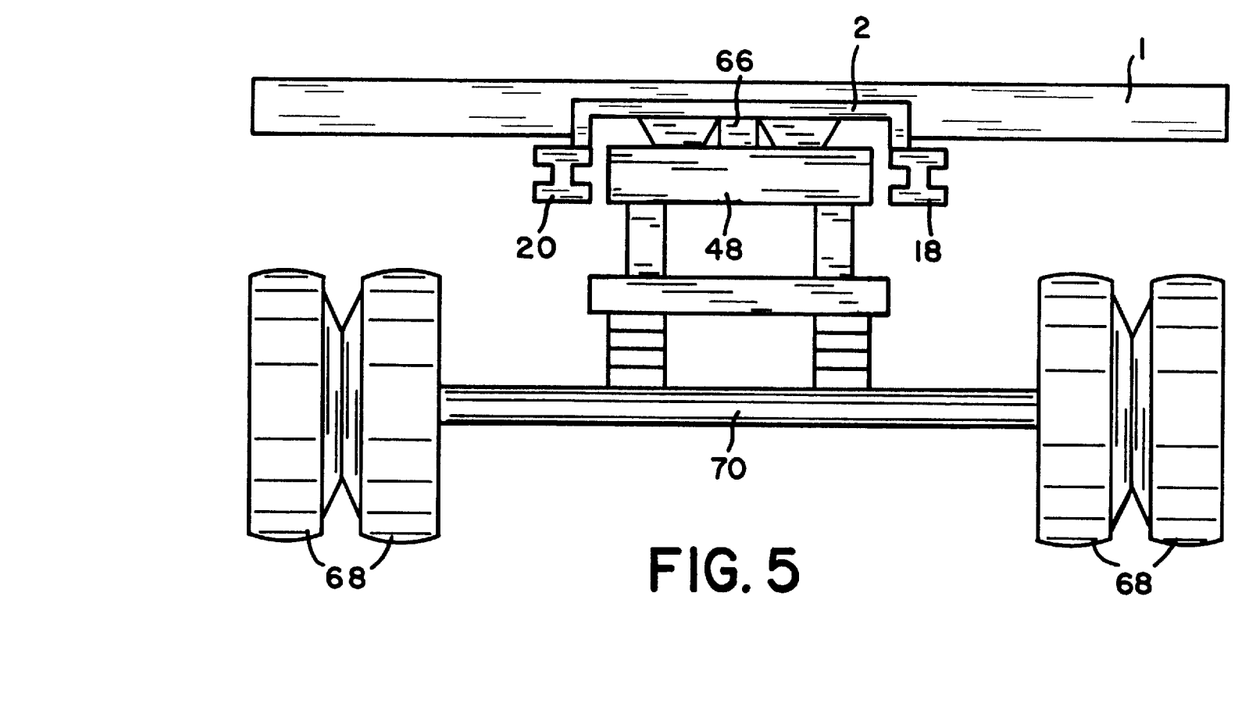
FIG. 5 is substantially a rear view of the rear axle.

Referring now to FIG. 5 wherein dolly (48) further includes a rear dual pair of wheels (68), a rear axle (70) and other related suspension structures fixedly attached to dolly (48), it is well known in the art that these are standard prior art components and are therefore not completely shown herein, as FIG. 5 only represents a general wheel supporting structure and is shown merely to indicate that some structure is needed to support wheels (68) and axle (70). It is to be noted that other wheel suspension components such as springs, shock absorbers, brakes, etc., are not shown for simplicity sake, but would be included in any operational version of this invention.

Figure 4:
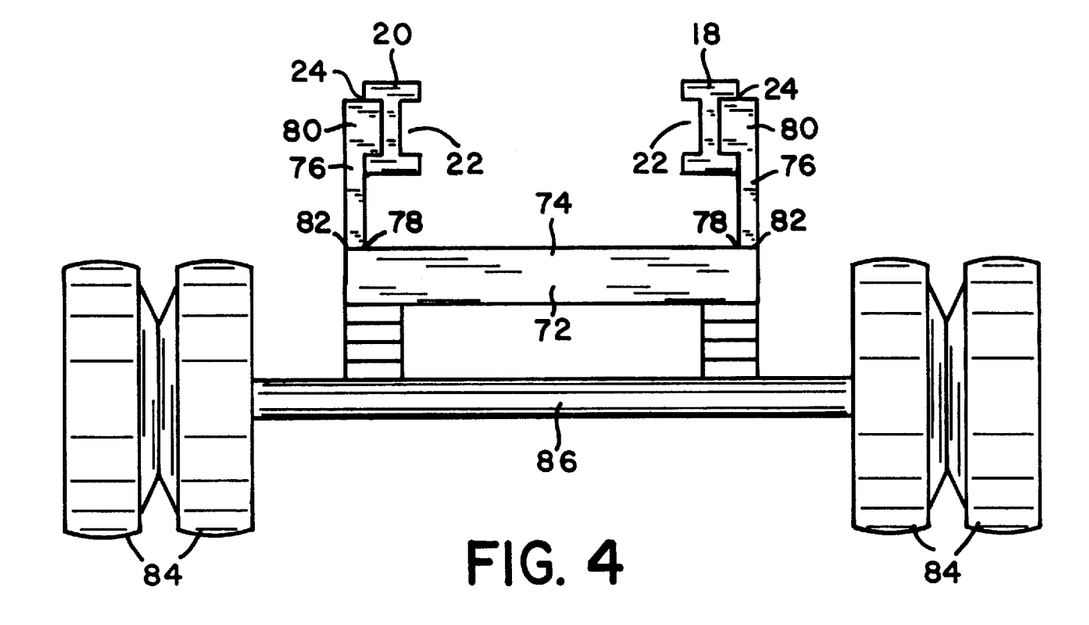
FIG. 4 is substantially a rear view of the front axle.

Referring now to FIG. 4, wherein we show a sliding under carriage (72) which includes substantially a base plate (74) having multiple uprising support members (76), base plate (74) providing a second horizontal X-axis which is substantially longer than the first horizontal X-axis between the outermost exterior surfaces of each I-beam (18 & 20), thus providing first and second horizontal protruding edges (78). Uprising support members (76) each being substantially L-shaped having a short leg (80) and a long leg (82), with the long leg (82) being fixedly attached to one of the edges (78), whereby, short legs (80) are spaced apart and opposed to each other, and each short leg (80) is of a shape and size to be slidably received within each exterior cavity (24).

Base plate (74) further includes a front dual pair of wheels (84), a front axle (86) and other related suspension structures fixedly attached to base plate (74), and it is well known in the art that these are standard prior art components and are therefore not completely shown herein, as FIG. 4 only represents a general wheel supporting structure and is shown merely to indicate that some structure is needed to support wheels (84) and axle (86). It is to be noted that other wheel suspension components such as springs, shock absorbers, brakes, etc., are not shown for simplicity sake, but would be included in any operational version of this invention.

Figure 6:
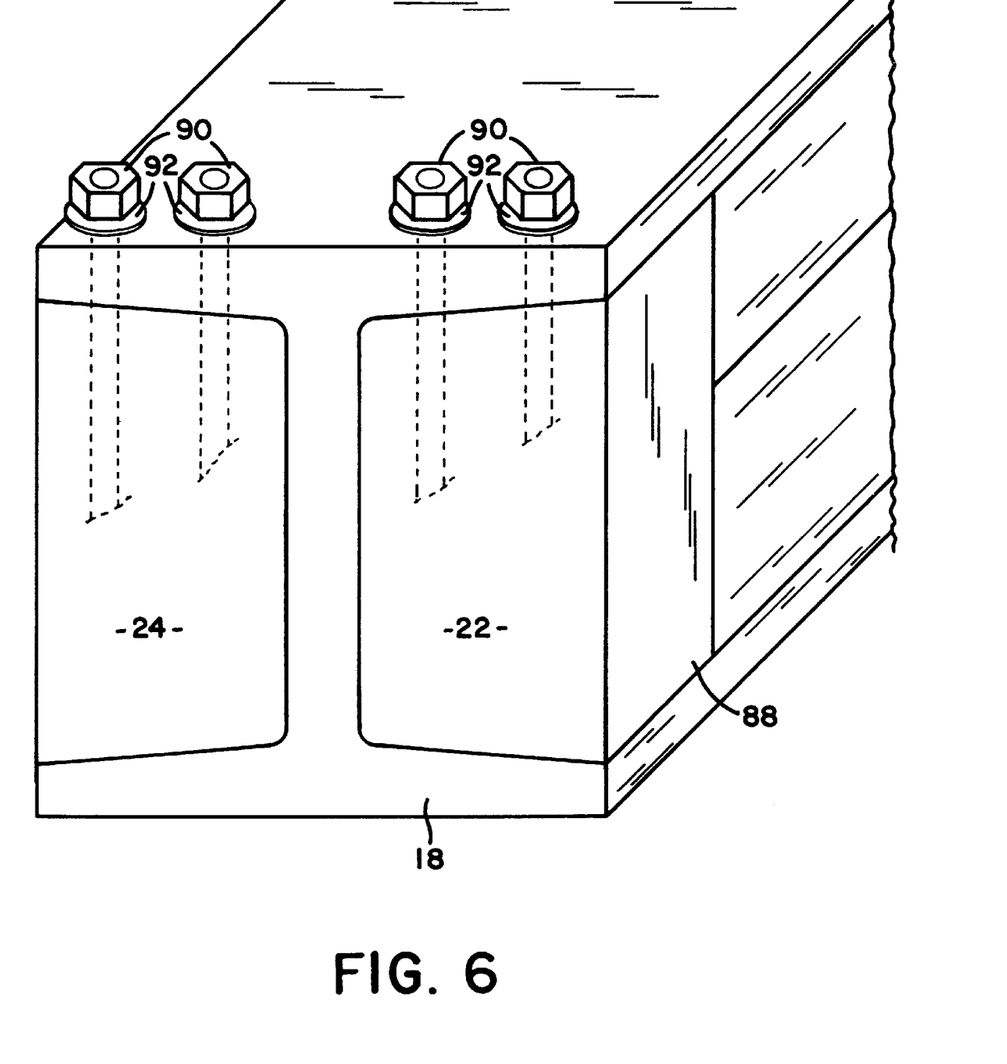
FIG. 6 is substantially a perspective view of an I-beam having stop means therein.

Referring now to FIG. 6 which is substantially an exemplary view of a stop means located within each of the I-beams (18 & 20), with the stop means comprising a block insert (88) which is of a shape and size to be inserted into either cavity (22 & 24) and which is fixedly attached within cavity (22 & 24) by suitable attachment means of choice, such as by multiple bolts (90) and washers (92), with bolts (90) being of a length substantially longer than the Y-axis of either I-beam (18 & 20), whereby, when bolts (90) are inserted vertically into either I-beam (18 & 20), bolts (90) will extend through the top portion of either I-beam (18 & 20) into either cavity (22 & 24) through block insert (88) and throughout the bottom of either I-beam (18 & 20) and are then secured by nuts (not shown), whereby, block insert (88) is fixedly attached within either I-beam at a location to space the axles to the proper position when retracted and likewise when extended.

Figure 7:
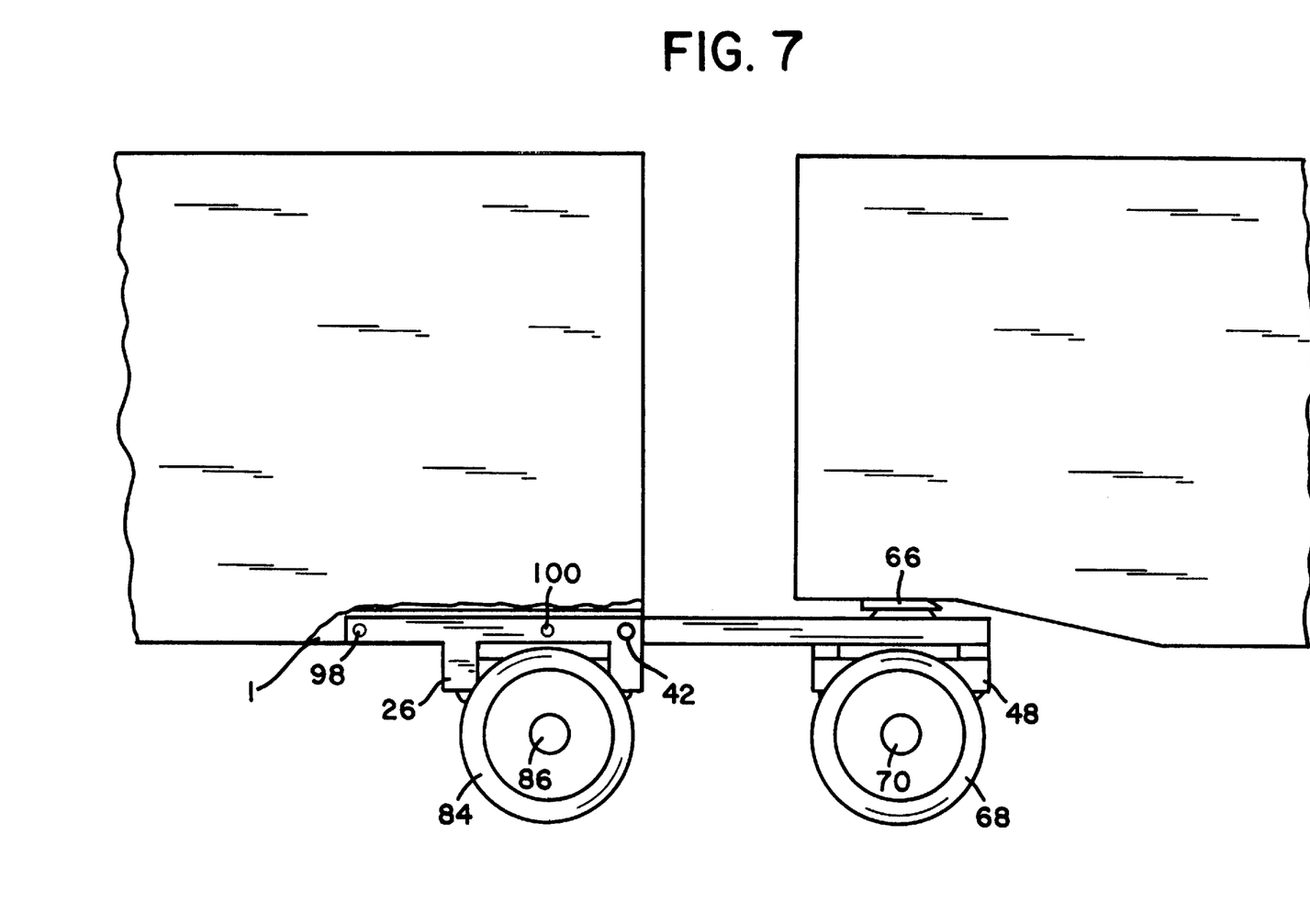
FIG. 7 is substantially a partial view showing the semitrailer when attached and pulling a second trailer.

Referring now to FIG. 7 which is substantially an overview of the semitrailer when attached and pulling a second trailer. It is to be noted that semitrailers are commonly equipped with pneumatic spring brake systems, such as is the present invention. However, in the preferred embodiment we provide a separate line (not shown) at the front of the trailer to power the air cylinders (96) in FIG. 2, thus no valves or switches are required, the air line leads from the glad hand (not shown) at the front of the trailer directly to the air cylinders, and when the line is removed the air drains from the cylinders, thus releasing the springs which whereby lock pins (94).

It is to be noted that the above pneumatic brake system is identical to the pneumatic parking brake and therefore complete specifications for the system are not completely disclosed herein.

It is to be further noted that this pneumatic brake system as installed within the present invention will provide unique advantages heretofore not seen nor taught, such as when the red line leading to the front of the trailer is disconnected from the red glad-hand which locks the trailer brakes, the red line is then used to unlock the pins. Therefore, when using this method, you cannot have the red line on two glad hands at the same time, which is a safety measure which prevents the unit from being moved with the pins unlocked. After the unit is locked and deemed to be ready, the driver can look directly at the pins, and if they are protruding from their cavity, the unit is locked.

MODE OF OPERATION

It will now be seen that we have provided a semitrailer which includes a front and a rear axle, each of which are positionable between a retracted position and an extended position, whereby the semitrailer can be used as either a dual axle trailer when the axles are retracted or as a single axle trailer having an attached dolly to pull a second trailer when the axles are extended. When it is desirous to pull a second trailer, the red line is removed from the red glad-hand at the front of the trailer and placed on a yellow line. This locks up the brakes on both axles (70 & 86) and releases the locking pins (94) by applying air to the canisters (96). The trailer is then pulled forward with the tractor (12), until the front axle (86) and attached sliding carriage (72) reach multiple stops (88) within I-beams (18 & 20). A switch (not shown) is then set, thus releasing the brakes on the front axle (86) while retaining the locked condition of the rear axle (70). The tractor is again pulled forward until the rear axle (70) and attached shuttle (26) reach multiple stops (88) within I-beams (18 & 20), thus rear axle (70) and shuttle (26) assume their extended position. The red line is then removed from the yellow glad-hand, thus releasing the air from the canisters (96) which are spring loaded to engage the locking pins (94).

It is to be noted that each of the I-beams (18 & 20) and each of the uprising support members (76) include two exterior holes (98 & 100) which are used for visual alignment, whereby, holes (98) are in alignment when the axles are retracted and holes (100) are in alignment when the axles are extended, this is caused by the rear axle (70) sliding four feet farther than the front axle (86).

With the axles (70 & 86) extended, the rear axle (70) is free to move up and down independent of the movement of the I-beams (18 & 20) by means of the pin (42) which is seated in multiple bushings (18, 40, 44 & 46) and held in a secure manner by shuttle (26) which is now in a locked position by multiple stop block inserts (88). It is to be noted that multiple stop block inserts (88) may be easily removed from within I-beams (18 & 20), which allows the shuttle (26) and the sliding carriage (72) to be easily removed for servicing.

It will now be seen that when the axles (70 & 86) are retracted, and the fifth wheel plate (66) is positioned under the floor of the trailer the fifth wheel is enclosed in a space provided by the use of a plate (2) spanning the distance between the two I-beams and raised to a height of three inches to accommodate the fifth wheel without raising the overall height of the rear of the trailer, and further causing the weight of the trailer to be supported by the combination of both axles (70 & 86) in a manner heretofore not seen nor taught within the prior art.

It is to be further noted that dolly (48) includes air lines and an electrical cord (not shown) which may be used to serve the second trailer.

It will now be seen that we have herein provided a semitrailer chassis having a fixedly attached dolly for pulling a second trailer thereon, thus the dolly cannot be removed by the driver and/or stolen.

It will further be seen that we have herein provided a dolly which is easier to hostle, is easier to back up, is safer with California chain laws, provides better braking as the second trailer includes two axles, and allows for more carrying capacity at the rear of the trailer due to the dual axles.

It will further be seen that we have herein provided a telescoping dual axle combination with dolly wherein the front axle stays under the rear of the trailer and thus carries the load without undue stress put on the frame, and this further allows for a lighter frame than the non-telescoping dual axle unit, and the rear axle slides far enough (beyond 8 feet) to qualify as two single axles, which allows the 20000 pounds each rule. Also, unlike the non telescoping dual axle unit, the second axle is also free to articulate in the vertical plane, which relieves any stress between the axles when the unit encounters uneven ground, which makes this unit an "A" train as opposed to the "B" train concept of the previous aforementioned invention. Therefore, the present invention provides a much lighter empty weight as well as a much higher axle weight allowance which would be much more desirable to the trucking companies.

It will also be seen that we have herein provided a dual axle trailer that can be converted to a single axle trailer with an attached dolly to pull a second trailer.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described the invention, what we claim and wish to secure by LETTERS PATENT is:

1. A convertible chassis for a dual axle semitrailer for converting said semitrailer to a single axle trailer with an attached dolly for pulling a second trailer, said semitrailer having two sides, a front, a front pair of dual wheels with attached front axle, a rear pair of dual wheels with attached rear axle, said wheels with each said attached axle being mounted in first spaced tandem relationship adjacent said rear when said chassis is in a retracted position and said wheels each having means to be locked and unlocked, said chassis comprising; a first elongated I-beam and a second elongated I-beam each being substantially equal in length to said one of said sides and each having multiple stop means therein, said first and said second I-beam being substantially positioned parallel to each other and spaced apart, thus providing a first horizontal X-axis between the outermost exterior surfaces of each said I-beam, each said I-beam having an interior elongated cavity and an exterior elongated cavity which are substantially opposed to each other, a rectangular shaped shuttle comprising; first and second cross members which are fixedly attached together and interconnected by first and second end members, said first and second end members being of a length longer than the distance between said cross members, thus said members in combination form said shuttle with said shuttle having two protruding end sections, each of said members are held in a secure manner by multiple support structures, and said end members are each of a shape and size to be slidably retained within each said interior cavity, said second cross member having at least a first and a second protruding bushing, said first and said second bushing each being of a shape and size to slidably receive an elongated pin there through, said pin having each end thereof fixedly attached to one of said end sections by a third and a forth bushing, said dolly comprising; an elongated bumper bar, a first and a second attachment bar and means to fixedly attach said rear dual pair of wheels to said dolly, each said attachment bar having a first end fixedly attached to said bumper bar, said each attachment bar being positioned substantially parallel to each other and spaced apart a distance less than the distance between each of said I-beams, each said attachment bar having a bore through each said second end thereof for slidably receiving said pin there through, thus said second end of said first attachment bar is pivotably attached to said pin between said first and said third bushing, and said second end of said second attachment bar is pivotably attached to said pin between said second and said forth bushing, thus said shuttle and said dolly are fixedly attached together in a pivotable relationship, a sliding under carriage comprising; substantially a base plate having multiple uprising support members and means to fixedly attach said front dual pair of wheels to said carriage, said base plate providing a second horizontal X-axis parallel to said first horizontal axis, said second horizontal X-axis being substantially longer than said first horizontal X-axis thus providing first and second horizontal protruding edges, said uprising support members each being substantially L-shaped having a short leg and a long leg, said long leg being fixedly attached to one of said edges thus each said short leg is spaced apart and opposed to each other and each said short leg is of a shape and size to be slidably received within each said exterior cavity.

2. The chassis of claim 1 wherein said stop means substantially comprises a block insert which is of a shape and size to be inserted into either said cavity and said block is removably attached therein.

* * * * *